United States Patent
Winter et al.

(10) Patent No.: US 7,302,167 B2
(45) Date of Patent: Nov. 27, 2007

(54) METHOD FOR RECORDING OR REPRODUCTION OF SUB-PICTURE DATA ACCOMPANYING VIDEO SIGNALS CORRESPONDING APPARATUS SIGNAL AND DATA CARRIER

(75) Inventors: Marco Winter, Hannover (DE); Dirk Adolph, Ronnenberg (DE)

(73) Assignee: Thomson Licensing, Boulogne (FR)

( * ) Notice: Subject to any disclaimer, the term of this patent is extended or adjusted under 35 U.S.C. 154(b) by 971 days.

(21) Appl. No.: 10/468,560

(22) PCT Filed: Feb. 14, 2002

(86) PCT No.: PCT/EP02/01596

§ 371 (c)(1),
(2), (4) Date: Aug. 21, 2003

(87) PCT Pub. No.: WO02/069646

PCT Pub. Date: Sep. 6, 2002

(65) Prior Publication Data

US 2004/0076405 A1 Apr. 22, 2004

(30) Foreign Application Priority Data

Feb. 26, 2001 (EP) .................................. 01104759

(51) Int. Cl.
*H04N 5/91* (2006.01)

(52) U.S. Cl. ........................................ 386/95; 386/109
(58) Field of Classification Search .................. 386/95, 386/109
See application file for complete search history.

(56) References Cited

U.S. PATENT DOCUMENTS

| 6,031,963 A * | 2/2000 | Kitamura et al. ............ 386/109 |
| 6,219,043 B1 * | 4/2001 | Yogeshwar et al. ........... 341/55 |
| 6,625,388 B2 * | 9/2003 | Winter et al. .................. 386/83 |
| 2003/0133698 A1 * | 7/2003 | Winter ......................... 386/95 |

FOREIGN PATENT DOCUMENTS

| EP | 875893 | 11/1998 |
| EP | 961504 | 12/1999 |

* cited by examiner

*Primary Examiner*—Thai Q. Tran
*Assistant Examiner*—Daniel Tekle
(74) *Attorney, Agent, or Firm*—Joseph J. Laks; Ronald H. Kurdyla; Joseph J. Opalach (57) ABSTRACT

According to the invention sub-picture data are organized in sub-picture units, the sub-picture units comprising pixel data in a pixel data area as well as display control data and/or address information data, wherein a sub-picture unit of a second sub-picture stream is inserted into the pixel data area of a sub-picture unit of a first sub-picture stream. This permits several sub-picture streams for systems, which are defined to allow only a single sub-picture stream. Especially for DVD-VR conflicts with the already existing DVD-VR specification are avoided. Therefore, enhanced DVD-VR devices using the invention are able to record and playback additional sub-picture streams and conventional DVD-VR devices are able to record and playback the same signal without any compatibility problems, although restricted to only a single sub-picture stream.

13 Claims, 6 Drawing Sheets

METHOD FOR RECORDING OR REPRODUCTION OF SUB-PICTURE DATA ACCOMPANYING VIDEO SIGNALS CORRESPONDING APPARATUS SIGNAL AND DATA CARRIER

This application claims the benefit, under 35 U.S.C. § 365 of International Application PCT/EP02/01596, filed Feb. 14, 2002, which was published in accordance with PCT Article 21(2) on Sep. 6, 2002 in English and which claims the benefit of European patent application No. 01104759.4, filed Feb. 26, 2001.

The invention relates to a method for recording or reproduction of sub-picture data accompanying video signals. The invention furthermore relates to an apparatus in which the method for the recording or reproduction of sub-picture data accompanying video signals is employed and to a corresponding signal and data carrier.

PRIOR ART

DVD-Video players use sub-picture streams for overlaying the video signals with subtitles, captions, menus, karaoke lyrics or other displayable information. Up to 32 sub-picture streams are supported, wherein Sub-picture Units (SPU) are defined as access units of the respective sub-picture streams.

A SPU consists of 3 parts:
a) SPUH—Sub-picture Unit Header
b) PXD—Pixel Data
c) SP_DCSQT—Sub-picture Display Control Sequence Table The SPUH contains the size of the whole SPU and the start location of SP_DCSQT. PXD contains a run-length compressed bitmap. SP_DCSQT contains a command sequence to define the sub-picture size and the location on the screen, the used colors and the transparency of the sub-picture.

Further details on the structure of the sub-picture units may be found in the DVD Standard for DVD-Video, Video, DVD Specifications for read-only disc, part 3, video specification, Version 1.01 August 1996, Section 5.4.3 Sub-picture Unit (SPU).

For the recording on DVD discs several further specifications have been defined, like DVD-RAM and DVD+RW which serve for general read-and-write applications in the PC or consumer electronics area, DVD-R which is used for write-once recordable media and DVD–RW which is a rewritable version of DVD-R. These specifications describe the physical parameters and the file systems of the respective discs as well as the special requirements for the recording of video signals for the so-called DVD-VR. One of the restrictions of DVD-VR is that it allows only one sub-picture stream at the same time (see Specification for Rewritable/Re-recordable/Recordable Discs, Part3 Video Recording, Version 1.2, Part 3, 4.2.2 Movie VOB Stream Information, (RBP 3) SPST_Ns).

INVENTION

It is one object of the invention to disclose a method for recording of sub-picture data accompanying video signals, which makes more than one sub-picture stream possible for systems, which are defined to allow only a single sub-picture stream. This object is achieved by the method disclosed in claim 1.

The invention is based on the recognition of the following facts. As the sub-picture display control command sequence table SP_DCSQT defines the used areas of the pixel data field PXD, it is also possible to generate such a sub-picture display control command sequence table SP_DCSQT which uses only a part of the pixel data field PXD. Furthermore, the sub-picture units of the most commercial DVD Video discs do not use the complete pixel data field PXD but nevertheless can be handled by the DVD Players on the market. Therefore, parts of a pixel data field PXD not used for a bitmap can be utilized for other purposes.

According to the invention sub-picture data are organized in sub-picture units, the sub-picture units comprising pixel data in a pixel data area as well as display control data and/or address information data, wherein a sub-picture unit of a second sub-picture stream is inserted into the pixel data area of a sub-picture unit of a first sub-picture stream.

This permits several sub-picture streams for systems which are defined to allow only a single sub-picture stream. Especially for DVD-VR conflicts with the already existing DVD-VR specification are avoided. Therefore, enhanced DVD-VR devices using the invention are able to record and playback additional sub-picture streams and conventional DVD-VR devices are able to record and playback the same signal without any compatibility problems, although restricted to only a single sub-picture stream. For example, an enhanced DVD-VR devices using the invention allows copying of movies from a DVD-Video disc including several Sub-picture streams for subtitles in different languages to a DVD Video Recording disc.

A corresponding recording and/or reproduction apparatus for performing the inventive method is specified in claim 12, a corresponding signal and data carrier comprising the signal are specified in claims 13 and 14, respectively.

Advantageous additional embodiments of the invention are disclosed in the respective dependent claims.

DRAWINGS

Exemplary embodiments of the invention are illustrated in the drawings and are explained in more detail in the description below. In the drawings.

EXEMPLARY EMBODIMENTS OF THE INVENTION

Figure 1:
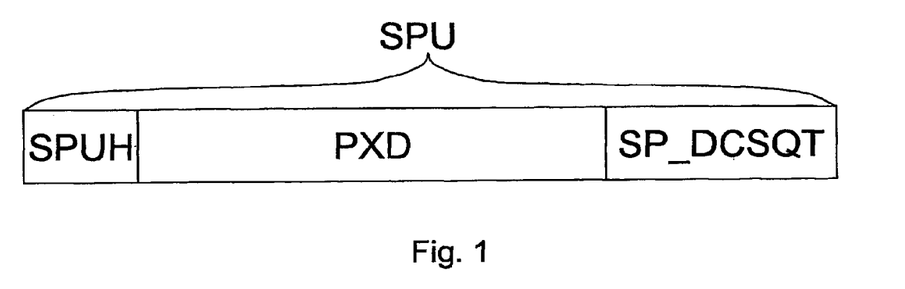
FIG. 1 shows the structure of a sub-picture unit according to the DVD video standard.

FIG. 1 illustrates the structure of a main sub-picture unit SPU. As defined in the DVD-Video Standard mentioned in the introduction, a header section SPUH is followed by a pixel data field PXD and finally by a sub-picture display control command sequence table SP_DCSQT. The pixel data field PXD may only comprise pixel data for the main sub-picture unit SPU as specified in the above-mentioned standard. In this case the pixel data of the sub-picture unit determine the displayed pattern of the sub-picture. For each pixel of a row of the sub-picture, a data word 2 bits wide specifies whether the pixel is a character pixel or a background pixel or whether the pixel is to be highlighted in a first manner or in a second manner. The individual pixel data are not stored in this pure form but in compressed form using run length coding. However, according to the invention further sub-picture units are located in the pixel data field PXD, either in addition to the pixel data for the main sub-picture unit SPU or totally replacing these pixel data.

Figure 2:
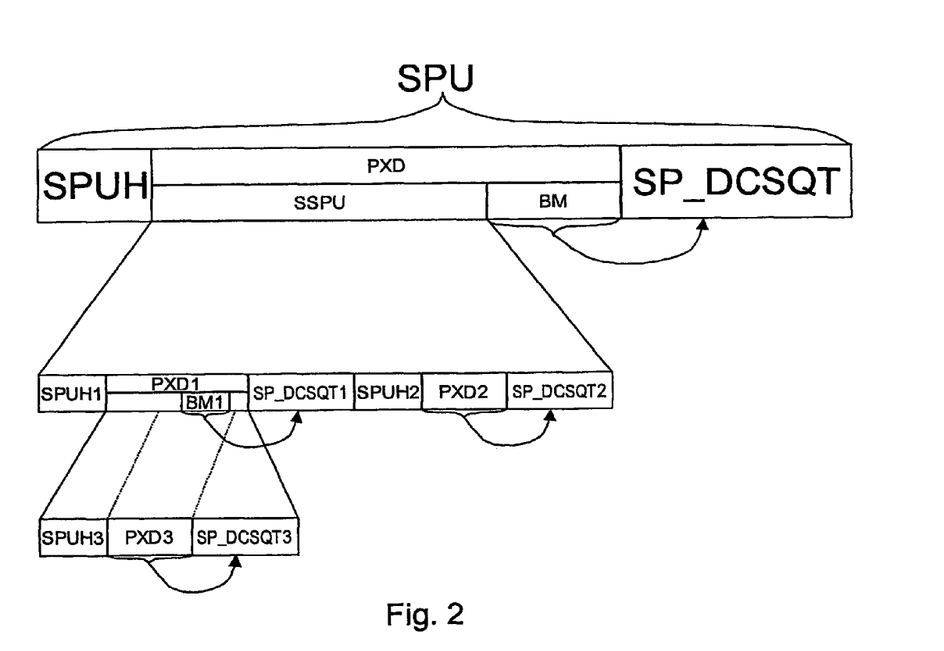
FIG. 2 shows the structure of an inventive embodiment of a sub-picture unit containing other sub-picture units.

FIG. 2 shows the structure of a main sub-picture unit SPU containing other sub-picture units in more detail. The pixel data field PXD of the main sub-picture unit SPU contains several additional sub-picture units in the data area SSPU and a run-length compressed bitmap BM comprising the picture content of the main sub-picture. The sub-picture Display Control Sequence Table SP_DCSQT contains the command sequence to define the size and the location on the screen, the used colors and the transparency of the main sub-picture.

In the data area SSPU two additional sub-picture units are inserted, each consisting of header sections SPUH1 and SPUH2, pixel data fields PXD1 and PXD2 as well as sub-picture display control command sequence tables SP_DCSQT1 and SP_DCSQT2, respectively. The first additional sub-picture unit uses only a part of the pixel data field PXD1 for the bitmap. In the remaining part of the pixel data field PXD1 a third sub-picture unit is inserted, consisting of the header section SPUH3, the pixel data field PXD3 and the sub-picture display control command sequence tables SP_DCSQT3.

Current DVD sub-picture decoders are able to present sub-picture units described by FIG. 1 as well as sub-picture units of the format described by FIG. 2. That means that the format described by FIG. 2 is compatible to all players, which supports the current format described by FIG. 1. However, current players would only be able to playback the main sub-picture units, not the sub-picture units inside the main sub-picture units.

For the example of an implementation for a DVD-VR device this means the following: DVD-VR as specified allows only one Sub-picture stream per Video Object. However, FIG. 2 shows a way to implement such enhanced sub-picture units for DVD-VR without any conflicts with conventional DVD-VR devices. Therefore, an enhanced DVD-VR device is able to handle up to 32 Sub-picture streams per Video Object. This enables a DVD-VR to copy Movies from a DVD Video disc including all sub-titles.

Figure 3:
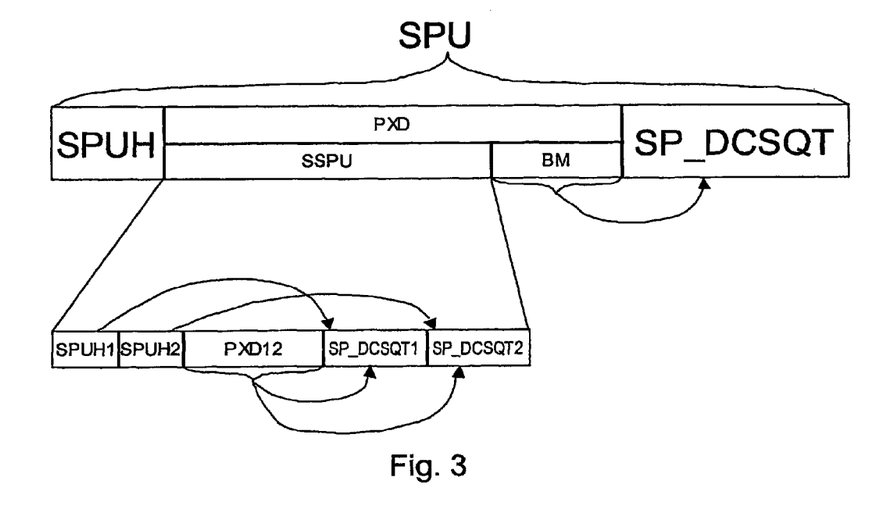
FIG. 3 shows the structure of a further inventive embodiment of a sub-picture unit with interlaced sub-picture units.

The structure of a sub-picture unit with interlaced sub-picture units is shown in FIG. 3. As in FIG. 2 two additional sub-picture units with header sections SPUH1 and SPUH2 and sub-picture display control command sequence tables SP_DCSQT1 and SP_DCSQT2, are inserted in the data area SSPU. Both sub-picture units access a common pixel data field PXD12. However, the sub sub-picture units are arranged in an interlaced manner. The respective header sections SPUH1 and SPUH2 are consecutively organized, followed by the pixel data field PXD12, followed in turn by the consecutively organized sub-picture display control command sequence tables SP_DCSQT1 and SP_DCSQT2. This allows to reduce the size of the whole main sub-picture unit by avoiding stuffing bytes which otherwise may be necessary due to the standardized upper limit of the size of sub-picture display control command sequence tables SP_DCSQT which shall be equal to or less than the half of the size of sub-picture unit (see DVD Specifications for read-only disc, part 3, video specification, Version 1.0, August 1996, Section 5.4.3.1 Sub-picture Unit Header).

Figure 4:
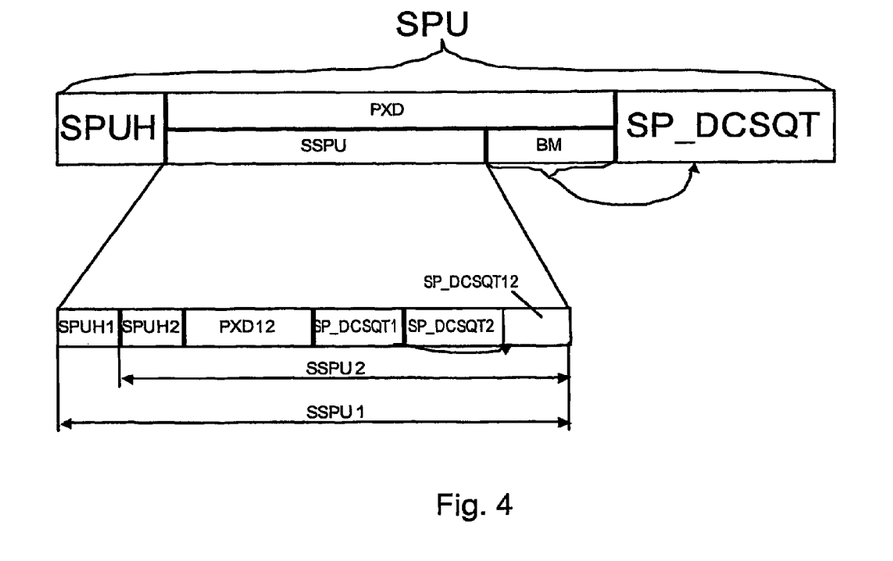
FIG. 4 shows the structure of a further inventive embodiment of a sub-picture unit with reduced size of the main sub-picture unit.

A further possibility to reduce the size of the whole main sub-picture unit is shown in FIG. 4. The structure of the sub-picture unit comprising sub sub-picture units is similar to the example of FIG. 3. However, in this example two sub-picture units SSPU1 and SSPU2 have different starting points but the same end of the sub-picture display control command sequence tables. This can be achieved by inserting first parts of the respective sub-picture display control command sequence tables in consecutive areas SP_DCSQT1 and SP_DCSQT1, each used only by the respective sub sub-picture unit, and inserting second parts in an area SP_DCSQT12 commonly used by both sub sub-picture units.

The invention can be used to record additional information like title data or the date and time of the recording process with the possibility to select whether these data are inserted into the video picture or are blanked out. These functions are especially useful for portable recording devices like a DVD camcorder but can also be implemented into stationary devices like a DVD video recorder. The user can carry out inputs, e.g. a title, via a keyboard which may be integrated in a remote control or via other input means. A sub-picture unit for the data that have been input is then generated in a sub-picture coding unit. Time-of-day data and also date details can be delivered by a real-time clock implemented in the apparatus.

Figure 5:
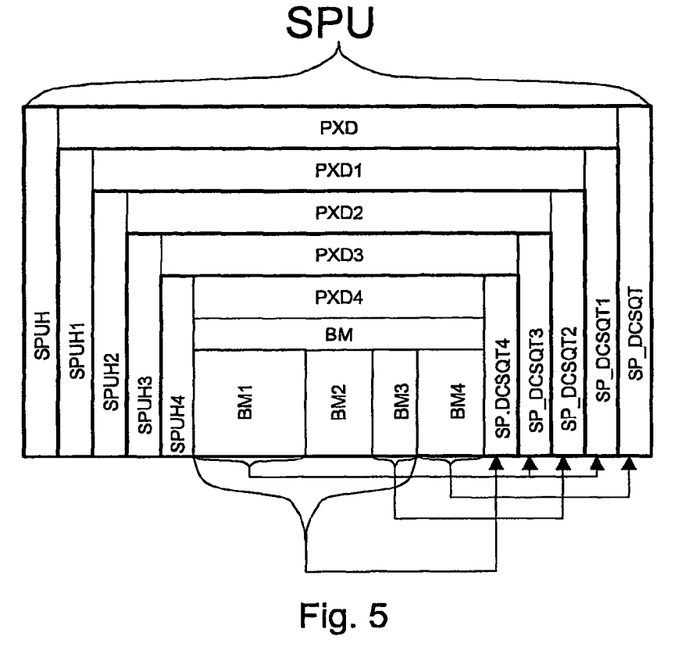
FIG. 5 shows the structure of an example with a combination of five different sub-picture units inside one main sub-picture unit.

An example using a combination of four additional sub sub-picture units inside one main sub-picture unit for recording such additional information is shown in FIG. 5. The five sub-picture units shall allow to display five different sub-pictures with the following similar content:
1. the text "THOMSON multimedia" at the bottom of the screen;
2. the text "$15^{th}$ of Dec. 1999" in the top part of the screen;
3. the text "16:34:56" at the bottom of the screen;
4. the text "$15^{th}$ of Dec. 1999-16:34:56" at the top of the screen;
5. the text "$15^{th}$ of Dec. 1999" in the top part of the screen and the text "16:34:56" at the bottom of the screen.

The main sub-picture unit consists of the following parts in the given order:
1. sub-picture Unit Header SPUH of the main Sub-picture Unit SPU;
2. sub-picture Unit Header SPUH1 of the first sub Sub-picture Unit;
3. sub-picture Unit Header SPUH2 of the second sub Sub-picture Unit;
4. sub-picture Unit Header SPUH3 of the third sub Sub-picture Unit;

5. sub-picture Unit Header SPUH4 of the fourth sub Sub-picture Unit;
6. run-length compressed bitmap BM1 of the text "15<sup>th</sup> of Dec. 1999-16:34:56";
7. run-length compressed bitmap BM2 of the empty lines between the text "15<sup>th</sup> of Dec. 1999-16:34:56" at the top and the text "16:34:56" at the bottom;
8. run-length compressed bitmap BM3 of the text "16:34:56";
9. run-length compressed bitmap BM4 of the text "THOMSON multimedia";
10. sub-picture display control command sequence table SP_DCSQT4 of sub sub-picture unit 4, which accesses to the bitmap parts BM1, BM2, BM3 of the above mentioned SPU parts 6 to 8 and which contains a command to make the text part "-16:34:56" of bitmap part BM1 invisible;
11. sub-picture display control command sequence table SP_DCSQT3 of sub sub-picture unit 3, which accesses to the bitmap BM1 of sub-picture unit part 6;
12. sub-picture display control command sequence table SP_DCSQT2 of sub sub-picture unit 2, which accesses to the bitmap BM3 of sub-picture unit part 8;
13. sub-picture display control command sequence table SP_DCSQT1 of sub sub-picture unit SPU 1, which accesses to the bitmap BM1 of sub-picture unit part 6 and which contains a command to make the text part "-16:34:56" invisible;
14. sub-picture display control command sequence table SP_DCSQT of the main sub-picture unit, which accesses to the bitmap BM4 of sub-picture unit part 9.

The additional sub-picture streams can be used to indicate the absolute recording time and the recording date (e.g. "15<sup>th</sup> of December" on the top of the screen and "16:34:56" at the bottom of the screen) and variations of this data and user defined sub-titles. This additional information can be turned on or off by the user without any change/destroying of the MPEG coded video data.

A sub sub-picture unit inside a main sub-picture unit can be located using a table outside of the main sub-picture unit or via special control information inside the main sub-picture unit. Such special control commands could be:

1. All sub-picture unit headers of all sub sub-picture units must be stored contiguously immediately after the sub-picture unit header SPUH of the main sub-picture unit. After the last sub-picture unit headers in this SPUH-sequence two zero-bytes follow to indicate the end of the SPUH-sequence. With the knowledge of this rule no additional information outside the main sub-picture unit data is necessary to locate each sub sub-picture unit inside the main sub-picture unit.
2. All the sub sub-picture units must be stored contiguously immediately after the sub-picture unit header SPUH of the main sub-picture unit. After the last sub sub-picture unit follows the run-length compressed bitmap of the main sub-picture unit and then the sub-picture display control command sequence table SP_DCSQT of the main sub-picture unit.

The number of sub sub-picture units per main sub-picture unit is restricted, e.g. to a number of 32. After the sub-picture unit header SPUH of the main sub-picture unit follows a bit field, e.g. 4 bytes=32 bits. Each bit of this field indicates whether a sub sub-picture unit of this Sub-picture stream exists inside this main sub-picture unit. After this bit field the sub-picture unit headers of all sub sub-picture units follow immediately, similar to control commands point 1 above. The order of the sub-picture unit headers is the ascending Sub-picture stream number in order to get an unambiguous assignment to the bit field, i.e. sub-picture units exist inside this main sub-picture unit only for Sub-picture streams, which are indicated by the bit field.

3. In order to avoid a contiguous sub-picture unit header sequence it is also possible to add a pointer list to each sub sub-picture unit behind the sub-picture unit header of the main sub-picture unit.
4. A magic word immediately after the sub-picture unit header of the main sub-picture unit could indicate whether this main sub-picture unit contains sub sub-picture units or not. This magic word would be helpful for such an enhanced sub-picture unit demultiplexer to distinguish between conventional sub-picture units and such enhanced sub-picture units. The magic word should consist of one or more illegal run-length code words is (e.g. a 2 byte value: first byte is zero and the second byte is greater than 3), because conventional sub-picture units have no illegal run-length code words inside the PXD data area. For example, a magic code word could consist of the following 6 bytes: 0 83 0 72 0 79.

Figure 6:
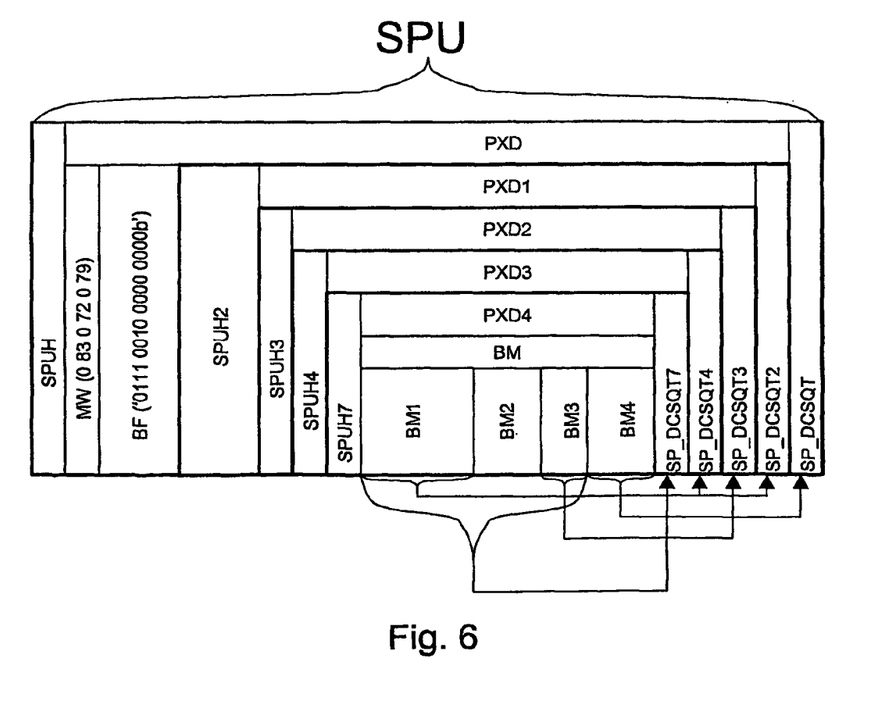
FIG. 6 shows the example of FIG. 5 in more detail, especially including control commands.

FIG. 6 shows an example of an enhanced sub-picture unit using such special control commands. After the sub-picture unit header SPUH of the main sub-picture unit follows a 6 byte magic word MW, e.g. with the value 0 83 0 72 0 79. The following 2 byte bit field BF indicates for which of 32 sub-picture streams (MSB=Sub-picture stream 1; LSB=Sub-picture stream 32) sub-picture units are transmitted, in this case the value 0111 0010 0000 0000b signalizes sub-picture units for the additional sub-picture streams 2, 3, 4 and 7. Then follows the sequence of sub-picture unit headers SPUH2, SPUH3, SPUH4, SPUH7 of all occurring sub sub-picture units (as many as sub sub-picture units are indicated by the 32 bit field), then all run-length compressed bitmap parts BM1, BM2, BM3, BM4 used by the main and sub sub-picture units, then the sub-picture display control sequence tables SP_DCSQT7, SP_DCSQT4, SP_DCSQT3, SP_DCSQT2, SP_DCSQT of all sub sub-picture units and the main sub-picture unit. Interlaced sub sub-picture units and overlapped sub-picture display control sequence tables are allowed.

The main sub-picture unit is always the sub-picture unit for sub-picture stream 1. If the MSB of the bit field indicates a sub sub-picture unit, then this sub sub-picture unit shall be used as sub-picture unit for Sub-picture stream 1. This makes the use of completely different sub-picture units possible (inclusively sub-picture stream 1) for enhanced DVD stream demultiplexer as for conventional DVD stream demultiplexer.

In order to indicate the occurring of sub sub-picture units inside the Video Objects some additional information may be recorded inside the Navigation Data for enhancing the convenience for the user. Possible locations of such additional information are:

1. Movie VOB Stream Information M_VOB_STI (see DVD-VR specification version 1.0, section 4.2.2): the number of Sub-picture streams may be used to indicate the number of possible Sub-picture streams (e.g. 32). Although the DVD-VR specification restricts this value to 1, another value than 1 could be used for certain applications.
2. Movie VOB Stream Information M_VOB_STI (see DVD-VR specification version 1.0, section 4.2.2): one of the reserved bytes (relative byte position 10 to 11) could be used to indicate the maximum number of Sub-picture streams, realized as sub sub-picture units of the main sub-picture unit. Although the DVD-VR specification restricts these reserved values to 0, conventional DVD-VR stream demultiplexer would have no problems with such tables.

This reserved area could also contain an ID, which selects additional information from the Manufacturer's Information (see point 3 below), e.g. a table assigning a language to each Sub-picture stream.

3. Manufacturer's Information MNFI (section 4.7.3 of the DVD-VR specification): This location could also be used to store an information like the maximum number of sub-picture streams. More detailed information, e.g. a table with the number of sub-picture streams for each Video Object, is also possible but more difficult to handle, because another DVD-VR device could change the navigation data without any knowledge about this Video Object related information. This detailed information may be invalid (not up-to-date) after an editing of the disc by another (conventional) DVD-VR device. However, this problem could be solved as indicated already in point 2 above: With an ID inside M_VOB_STI an unambiguous relation would be kept between MNFI and each M_VOB_STI. The MNFI area could also be used to keep information about the content of the diverse Sub-picture streams, e.g. the language. That's especially useful for a copy of a movie from a DVD Video disc with sub-titles of several languages to a DVD VR disc.

Figure 7:
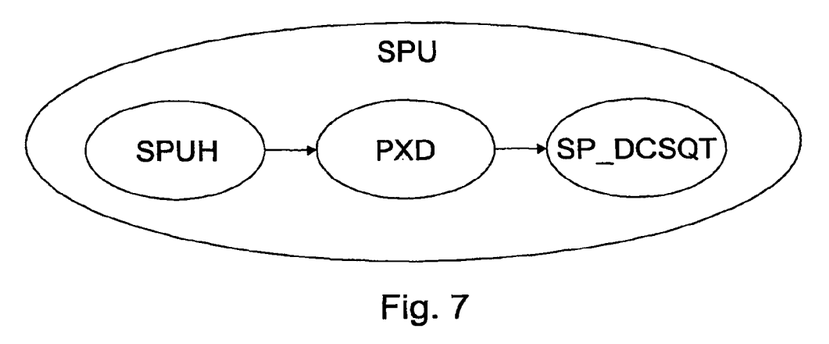
FIG. 7 shows a flow diagram for generating the signal structure of a sub-picture unit according to FIG. 1.
Figure 8:
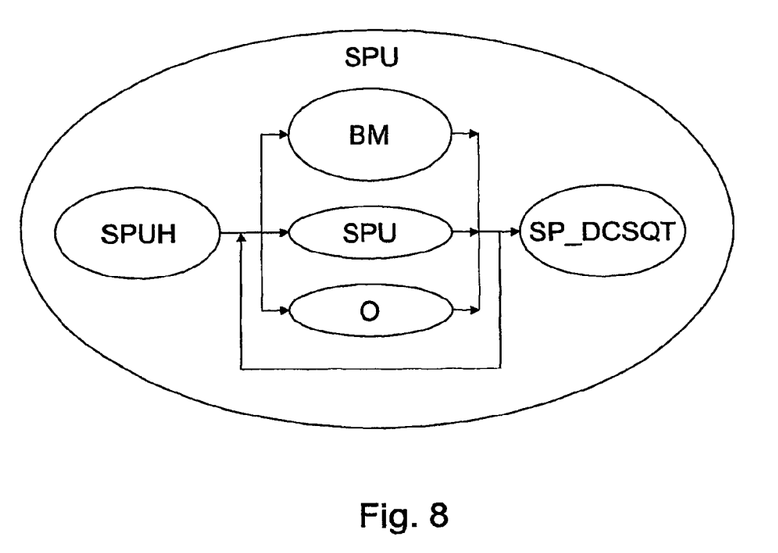
FIG. 8 shows a generalized flow diagram for generating the signal structure of a sub-picture unit according to FIG. 2.
Figure 9:
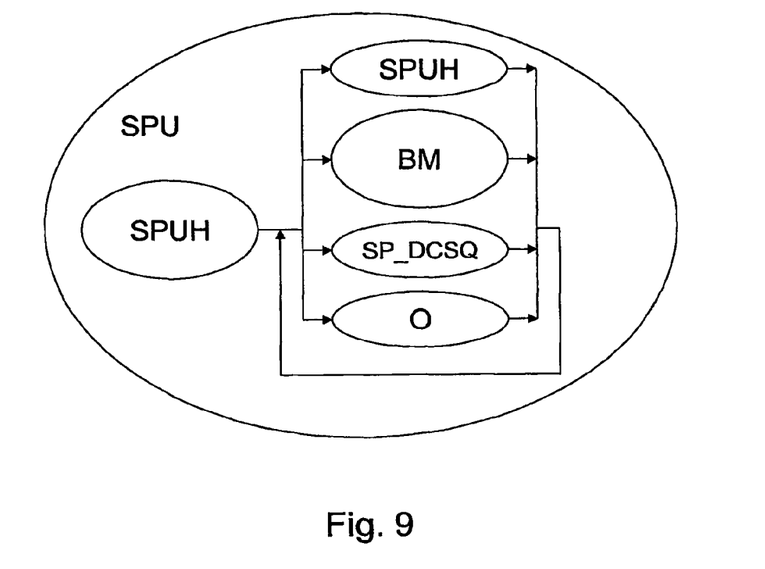
FIG. 9 shows a generalized flow diagram for generating the signal structure of a sub-picture unit according to FIG. 3.
Figure 10:
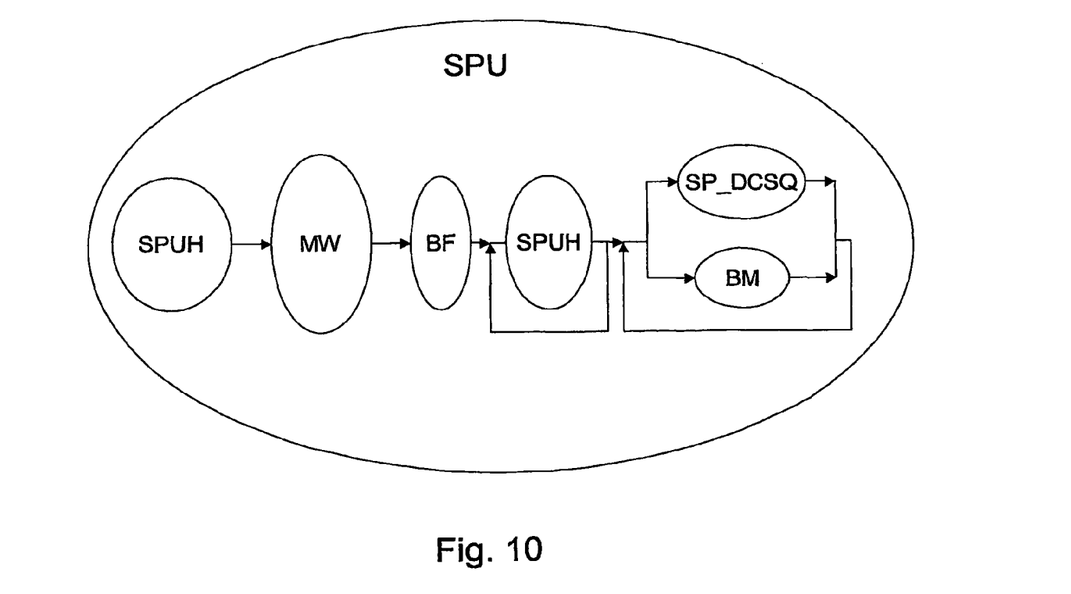
FIG. 10 shows a generalized flow diagram for generating the signal structure of a sub-picture unit according to FIG. 4.

A more general definition of the sub-picture unit structures according to the invention is described by the FIGS. 7 to 10 which correspond to the examples shown in the FIGS. 1 to 4. The general structure of a main sub-picture unit SPU in FIG. 7 shows a sub-picture unit header section SPUH followed by a pixel data field PXD and a sub-picture display control command sequence table SP_DCSQT. FIG. 8 shows the structure within the pixel data field PXD in more detail. The pixel data field PXD may contain bitmaps BM comprising the picture content, sub-picture units SPU and other data O in arbitrary order. A more general definition of the sub-picture unit structure for memory optimized encoding of sub-picture units corresponding to the examples given in FIG. 3 and FIG. 4 is described by FIG. 9. In this case the sub-picture unit header section SPUH is followed by an arbitrary sequence of further sub-picture unit headers SPUH, bitmaps BM, sub-picture display control command sequence tables SP_DCSQT and other data O. Finally, FIG. 10 shows a more general definition of the exemplary structure given in FIG. 6. After the sub-picture unit header SPUH of the main sub-picture unit follows the magic word MW, the bit field BF for indicating the transmitted sub-picture streams, then a sequence of sub-picture unit headers SPUH and finally an arbitrary sequence of sub-picture display control sequence tables SP_DCSQT and bitmaps BM.

However, for sub-picture unit decoders requiring a strict separation of SPUH, PXD and SP_DCSQT, it is recommended to completely put the PXD of each SPU (Main and Sub SPU) between the SPUH and the SP_DCSQT of that SPU.

Figure 11:
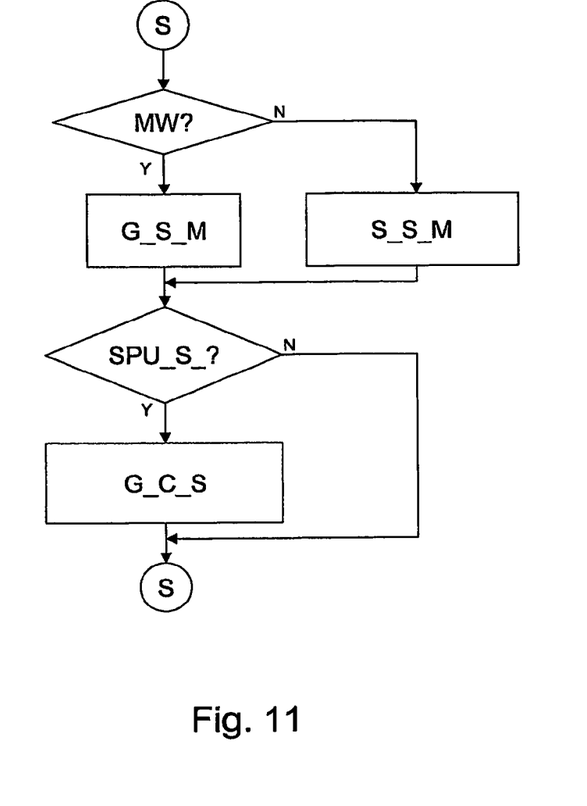
FIG. 11 shows a flow chart of a method for detecting a certain sub-picture stream.

FIG. 11 shows a flow chart of a method for detecting a certain sub-picture stream. After the start S it is checked in step MW? whether a current sub-picture unit comprises a magic word, e.g. with the value 0 83 0 72 0 79. If such a magic word is detected, a following sub-picture stream map in the form of e.g. a 2 byte bit field is extracted from the sub-picture unit in the following step G_S_M. Otherwise, the stream map is set to the value 1000 0000 0000 0000b in the step S_S_M, which signalizes that only sub-picture units for the sub-picture stream 1 are existing. In the following step SPU_S_? it is checked whether a sub-picture unit of the current sub-picture stream is enclosed, e.g. for a subtitle in a certain language requested by the user. If such a sub-picture unit of the current sub-picture stream is detected, this sub-picture unit is fed to a conventional sub-picture decoding unit, i.e. the corresponding sub-picture unit header, the pixel data and the sub-picture display control sequence table. After this the detecting process is repeated by returning to the start S.

Figure 12:
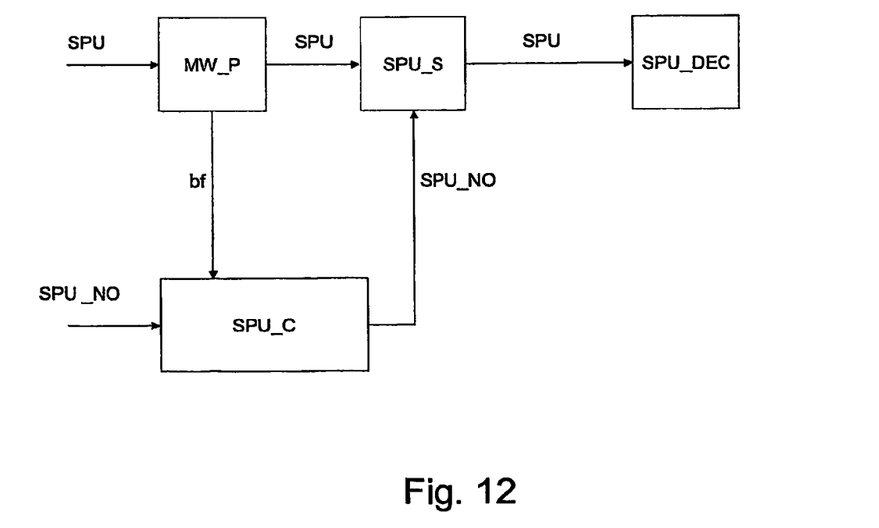
FIG. 12 shows a schematic block diagram of an apparatus for detecting a certain sub-picture stream.

FIG. 12 shows a schematic block diagram of a corresponding apparatus for detecting a certain sub-picture stream.

The incoming sub-picture units are analysed for a magic word by a magic word parser unit MW_P and after that forwarded to a selector unit SPU_S. The selector unit SPU_S separates sub-picture units of a current sub-picture stream and feeds these separated sub-picture units to a conventional sub-picture decoder SPU_DEC. For the selection process the selector unit SPU_S receives the current sub-picture stream number SPU_NO from a further analysing unit SPU_C, however, only when the sub-picture unit contains such a sub sub-picture unit. For this purpose the analysing unit SPU_C receives the current sub-picture stream number SPU_NO, e.g. corresponding to a selection command that has been input, and a sub-picture stream map from the magic word parser unit MW_P. This allows the sub-picture decoding unit to decode the sub-picture unit in accordance with the input. The sub-picture decoding unit then inserts the decoded data into the bit stream for the entire video picture.

The video data comprising sub-picture streams can be supplied by an optical storage disc, e.g. a DVD disc but can also originate from an other appropriate data source such as, for example, a video camera or a broadband cable or satellite receiver or an antenna for terrestrial reception.

The invention can e.g. be implemented in DVD video recorders or DVD camcorders. Also a similar use for a DVD audio recorder is possible in order to output title details, etc., via a display. However, the invention can also be used in any other apparatuses, which are defined to allow only a single sub-picture stream in order to circumvent this restriction.

The invention claimed is:

1. Method for recording sub-picture data accompanying video signals, comprising the steps of:
   organizing the sub-picture data in sub-picture units, wherein the sub-picture units comprise pixel data in a pixel data area as well as display control data and/or address information data; and
   inserting a sub-picture unit of a second sub-picture stream into the pixel data area of a sub-picture unit of a first sub-picture stream.

2. Method according to claim 1, wherein the pixel data area of the sub-picture unit of the first sub-picture stream comprises pixel data of the first sub-picture stream in a first data area and one or more additional sub-picture units of additional sub-picture streams in a second data area.

3. Method according to claim 1, further comprising the step of
   inserting sub-picture units belonging to different additional sub-picture streams into the pixel data area of the sub-picture unit of the first sub-picture stream.

4. Method according to claim 3, further comprising the step of
   arranging said sub-picture units sequentially in the pixel data area of the sub-picture unit of the first sub-picture stream.

5. Method according to claim 3, further comprising the step of
arranging said sub-picture units interleaved in the pixel data area of the sub-picture unit of the first sub-picture stream.

6. Method according to claim 5, further comprising the step of
arranging address information data for said sub-picture units sequentially, followed by pixel data for said sub-picture units, followed in turn by display control data for said sub-picture units.

7. Method according to claim 1, further comprising the step of
inserting a sub-picture unit of a third sub-picture stream into the pixel data area of a sub-picture unit of the second sub-picture stream.

8. Method according to claim 1, wherein the pixel data are forming a bitmap and wherein parts of the bitmap are commonly used for sub-picture units of different sub-picture streams.

9. Method according to claim 1, further comprising the step of
inserting one or more of the following information data at the beginning of the pixel data area of the sub-picture unit of the first sub-picture stream:
a first information data for indicating the insertion of one or more sub-picture units into the pixel data area;
a second information data for indicating the sub-picture streams of the inserted one or more sub-picture units;
a third information data for pointing to the beginning of the inserted one or more sub-picture units.

10. Method for reproducing sub-picture data accompanying video signals, comprising the steps of:
receiving sub-picture data being organized in sub-picture units, the sub-picture units comprising pixel data in a pixel data area as well as display control data and/or address information data;
extracting a sub-picture unit of a second sub-picture stream from the pixel data area of a sub-picture unit of a first sub-picture stream; and
decoding the sub-picture unit of said second sub-picture stream.

11. Method according to claim 10, further comprising the steps of
analyzing a first information data for indicating the insertion of one or more sub-picture units into the pixel data area;
analyzing in case of the indication of inserted sub-picture units a second information data for indicating the sub-picture streams of the inserted one or more sub-picture units; and
feeding sub-picture units of a current sub-picture stream to a decoding unit.

12. Apparatus for recording sub-picture data accompanying video signals comprising:
means for organizing the sub-picture data in sub-picture units, wherein the sub-picture units comprise pixel data in a pixel data area as well as display control data and/or address information data; and
means for inserting a sub-picture unit of a second sub-picture stream into the pixel data area of a sub-picture unit of a first sub-picture stream.

13. Apparatus for reproducing sub-picture data accompanying video signals, comprising:
means for receiving sub-picture data being organized in sub-picture units, the sub-picture units comprising pixel data in a pixel data area as well as display control data and/or address information data;
means for extracting a sub-picture unit of a second sub-picture stream from the pixel data area of a sub-picture unit of a first sub-picture stream; and
means for decoding the sub-picture unit of said second sub-picture stream.

* * * * *